(12) United States Patent
Timme et al.

(10) Patent No.: US 11,286,892 B2
(45) Date of Patent: Mar. 29, 2022

(54) AIR PIPE FOR MOTOR VEHICLES

(71) Applicant: Montaplast GmbH, Morsbach (DE)

(72) Inventors: Ralf Timme, Gärtringen (DE);
Muralikrishna Sarangla, Sindelfingen (DE); Alexander Benz, Gerlingen (DE); Viktor Benz, Sindelfingen (DE); Holger Stoppert, Sindelfingen (DE)

(73) Assignee: MONTAPLAST GMBH, Morsbach (DE)

( * ) Notice: Subject to any disclaimer, the term of this patent is extended or adjusted under 35 U.S.C. 154(b) by 0 days.

(21) Appl. No.: 17/053,608

(22) PCT Filed: Apr. 25, 2019

(86) PCT No.: PCT/EP2019/060617
§ 371 (c)(1),
(2) Date: Nov. 6, 2020

(87) PCT Pub. No.: WO2019/214959
PCT Pub. Date: Nov. 14, 2019

(65) Prior Publication Data
US 2021/0071626 A1   Mar. 11, 2021

(30) Foreign Application Priority Data

May 9, 2018 (DE) .................. 10 2018 111 191.6

(51) Int. Cl.
*F02M 35/10* (2006.01)
*F16L 11/112* (2006.01)
*F16L 11/115* (2006.01)

(52) U.S. Cl.
CPC .......... *F02M 35/10118* (2013.01); *F02M 35/10137* (2013.01); *F02M 35/10144* (2013.01); *F16L 11/112* (2013.01); *F16L 11/115* (2013.01)

(58) Field of Classification Search
CPC ....... F02M 35/10118; F02M 35/10137; F02M 35/10144; F02M 35/10111;
(Continued)

(56) References Cited

U.S. PATENT DOCUMENTS 1,819,175 A   8/1931   James
8,220,498 B2   7/2012   Van Hooren et al.

FOREIGN PATENT DOCUMENTS

CN   201236794 Y   5/2009
CN   203671065 U   6/2014
(Continued)

OTHER PUBLICATIONS

Int'l Search Report and Written Opinion dated Jul. 17, 2019 in PCT/EP2019/060617, English translation of Int'l Search Report only.
(Continued)

*Primary Examiner* — Jacob M Amick
*Assistant Examiner* — Charles J Brauch
(74) *Attorney, Agent, or Firm* — Panitch Schwarze Belisario & Nadel LLP (57) ABSTRACT

An air pipe for motor vehicles, in particular for connecting a hot component to a cold component, is provided. A first connector at a first end of the pipe is provided for securing the pipe in an airtight manner to a hot component and a second connector at a second end of the pipe is provided for securing the pipe in an airtight manner to a cold component. At least one flexible pipe portion is provided between the first and the second connectors. Supporting rings made from a material which is dimensionally stable in relation to the flexible pipe material are provided. The supporting rings surround a free pipe cross section and stabilize the cross-sectional shape of the flexible pipe portion.

20 Claims, 2 Drawing Sheets

(58) Field of Classification Search
CPC . F02M 35/10157; F16L 11/112; F16L 11/115; Y02T 10/12
See application file for complete search history.

(56) References Cited

FOREIGN PATENT DOCUMENTS

| | | | | |
|---|---|---|---|---|
| DE | 102004038087 | A1 | | 3/2006 |
| DE | 102004037088 | B3 | | 4/2006 |
| DE | 102004056272 | A1 * | 5/2006 | .............. F16L 11/12 |
| DE | 102004053985 | A1 | | 6/2006 |
| DE | 102007009906 | A1 | | 9/2008 |
| JP | S6045772 | A | | 3/1985 |

OTHER PUBLICATIONS

K_-Grote; J_ Feldhusen Dubbel_ Taschenbuch fuer Maschinenbau; 22_ Auflage Kapitel E67-E81 2019005176.
Int'l Preliminary Report on Patentability dated Nov. 10, 2020 in Int'l Application No. PCT/EP2019/060617.

* cited by examiner

AIR PIPE FOR MOTOR VEHICLES

CROSS-REFERENCE TO RELATED APPLICATIONS

This application is a Section 371 of International Application No. PCT/EP2019/060617, filed Apr. 25, 2019, which was published in the German language on Nov. 14, 2019, under International Publication No. WO 2019/214959 A1, which claims priority under 35 U.S.C. § 119(b) to German Application No. 10 2018 111 191.6, filed May 9, 2018, the disclosures of each of which are incorporated herein by reference in their entireties.

BACKGROUND OF THE INVENTION

The invention concerns an air pipe for motor vehicles, in particular for connecting a hot component to a cold component, wherein provided at a first end of the pipe is a first connector for air-tightly fixing the air pipe to a hot component and provided at the second end of the pipe is a second connector for air-tightly fixing the pipe to a cold component wherein at least one flexible pipe portion is provided between the first and the second connectors and wherein the pipe has a free pipe cross-section. In addition the pipe has support rings of a material which is dimensionally stable in relation to the flexible pipe material and which surround the free pipe cross-section and stabilize the flexible pipe portion in its cross-sectional shape.

Air pipes of the general kind set forth for motor vehicles, as are known for example from DE 10 2004 053 985 A1, DE 10 2004 037 088 B3, DE 10 2004 038 087 A1 or DE 10 2007 009 906 A1, are used for example to connect a turbocharger, a part of an internal combustion engine or another motor vehicle device involving an elevated operating temperature to a cold component like for example an air filter or some other air intake device. Thus, at the operating temperature of the motor vehicle, there can readily be a temperature difference of ≥100° C. between the hot component and the cold component. In that case the air pipe must at the same time provide a tolerance and/or vibration compensation effect between the connected components.

That relates on the one hand to tolerances by virtue of changing operating temperatures of the hot component, which also affects the connection region of the hot component to the air pipe. On the other hand, an air pipe is subjected to mechanical fluctuating stresses like oscillations, vibrations, tensile and/or thrust forces which can occur by virtue of operation of the vehicle. An air pipe therefore has to withstand high thermal and/or mechanical loadings over long periods of time.

In addition, an air pipe must be inexpensive to produce, in particular in the manufacture of motor vehicles in large-scale production, and they must be easy to fit and remove.

Previously known air pipes are often produced in the form of blow moldings which are to be connected by way of separate metal shells to the air feed and air discharge components like turbochargers and air filter housings. Manufacture and handling of those separate connectors, however, is complicated and laborious. Furthermore, pipes produced by a blow molding method, due to the procedure involved, generally suffer from irregular wall thicknesses, in particular if the pipe has a flexible portion in the manner of a bellows configuration with wave-shaped raised portions and recess portions. Those irregular wall thicknesses refer on the one hand to the various changes in direction in the bellows region but also the wall thickness of curved pipe regions, for example if the air pipe is in the form of an air induction manifold. The wall thickness of the air pipe in those manifold regions however can only be controlled with difficulty in a blow molding method.

On the other hand, such air pipes often have to withstand high reduced pressures in the pipe interior, in particular when used as an air induction pipe for a turbocharger or the like, in which case the cross-sectional geometry of the pipe should change only within limited tolerances in order to ensure defined air induction flow conditions.

In addition, high demands are to be made on the reliability of the air pipe over an operating period which is as long as possible, as for example damage to the pipe due to material fatigue can lead to a failure or a performance drop of the device supplied with the clean air like a turbocharger.

BRIEF SUMMARY OF THE INVENTION

The object of the invention is to provide an air pipe for motor vehicles, which can be inexpensively produced, which has a high level of operational reliability and a long service life and which is dimensionally stable even under a high pipe negative pressure.

That object is attained by an air pipe as set forth herein and devices connected to the air pipe as set forth herein. Advantageous embodiments are set forth herein.

According to the invention the pipe has a curvature and in the region of an inner curvature the support rings are of a smaller width in the longitudinal direction of the pipe than in the region of an outer curvature of the pipe. Accordingly, the flexible pipe material which provides the wall of the flexible pipe portion is particularly stabilized by the support rings. In that case the support rings are arranged spaced from each other in the longitudinal direction of the air pipe so that the flexible pipe material can compensate for movements between the hot component and the cold component, between the support rings. By virtue of the high level of dimensional stability of the support rings however the pipe is substantially stabilized and can withstand substantially higher negative pressures without collapsing. In that way the pipe on the one hand has a great degree of flexibility and on the other hand a high level of stiffness, in particular in relation to a negative pressure (collapse stiffness). The arrangement of the support rings provides that the mechanical stability of the air pipe can be particularly easily and effectively adapted to the respective requirements, for example by adaptation of the number of support rings per unit of length of the air pipe and/or the width of the support rings which thus also define the width of the pipe portion of flexible pipe material, that is arranged between adjacent support rings. The flexible pipe material preferably forms a continuous wall in the manner of a hose over the entire extent of the flexible pipe portion, also in the peripheral direction.

The air pipe according to the invention is particularly preferably in the form of an air pipe for use in the engine region, which pipe supplies a device of the engine or drive arrangement like in particular a turbocharger with air or discharges it from the device. The pipe can be in particular in the form of a clean air pipe for the supply of clean air to the device, that is to say a charge air pipe, in particular even at high charge pressures, or a dirty or unfiltered air pipe, in particular for the air management of a turbocharger. Optionally the pipe according to the invention can also be used for the air supply to or the air discharge from another device of a motor vehicle like a charge air intercooler, a heat exchanger or the like.

The support rings are preferably arranged radially at the inside at the wall of the flexible pipe portion, the support rings can be radially surrounded at the outside by the flexible pipe material, preferably over the entire extent thereof in the longitudinal direction of the pipe, and the entire periphery. The support rings can also be encased by the flexible pipe material in relation to the wall thickness of the support ring, that is to say radially enclosed at the inside and the outside by the pipe material so that this gives particularly good fixing of the support rings by the flexible pipe material. The support rings however can also be only partially enclosed or not enclosed by the flexible pipe material at their radial inside, whereby manufacture of the pipe with the support rings is substantially facilitated. It has also been found that in this way mechanical alternating stresses like for example oscillations or tensile and/or thrust forces on the pipe can be better absorbed and a long service life is ensured for the air pipe as for example a kind of notch action in the transitional region between the comparatively dimensionally stable material of the support rings and the flexible pipe material is avoided.

The flexural stiffness of the support ring material can be the factor ≥5 or ≥10, preferably ≥20 or ≥50 of the flexural stiffness of the material of the flexible pipe portions, in each case under the same testing conditions, using the currently applicable DIN Norm for determining flexural stiffness.

Particularly preferably the air pipe according to the invention is produced in a two-component or multi-component injection molding method so that both the support rings and also the material of the flexible pipe portion can be produced as different component parts in said injection molding method, preferably in the same injection molding tool. On the one hand the manufacturing costs are low in that way. On the other hand, however, the support rings and the flexible pipe portions can be produced with a particularly high level of dimensional accuracy like for example defined wall thicknesses and possibly other kinds of profiling. In particular it is possible in that way to effect particularly exact shape adaptation of the contact region of the support rings to the material of the flexible pipe portion. The mechanical properties of the pipe are thereby particularly well defined and are adjustable, in particular even having regard to high thermal demands relating to the connection of the hot air and the cold air component, particular mechanical alternating stresses, for example for compensating for oscillations between the two components connected with the pipe. The support ring and the material of the flexible pipe portion can thus be arranged in accurately fitting and gap-free relationship with each other. In addition the flexible material can enclose the support ring with a certain shrinkage stress directed towards the pipe interior, for example by virtue of different thermal coefficients of expansion of the various materials of the flexible pipe portion and the support ring, whereby the support ring is stabilized in position on the pipe in a particular fashion. The support ring material can preferably be connected to the material of the flexible pipe portion with a certain adhesive force, including in the sense of an adhesive bonding, or particularly preferably also by chemical reaction of the support ring material with the material of the flexible pipe portion when carrying out the injection molding method. That affords a particularly high holding force between the materials of the support ring and the flexible pipe portion and the pipe can therefore be subjected to particularly high mechanical and/or thermal stresses. Possibly however the support ring material may also have only a slight or practically no adhesion to the flexible pipe material if the latter is produced using a two-component injection molding method.

Production of the pipe using the injection molding method has proved its worth in particular in relation to pipes with a curvature in the longitudinal extent thereof like for example in the form of an air induction manifold as the pipe in the curvature region and the pipe regions adjoining same can be produced with particularly exactly defined wall thicknesses. That relates in particular to the pipe regions of flexible pipe material.

That is different in relation to air pipes which are produced using the blow molding method, where the flexible pipe material is of greatly irregular and partially non-reproduceable wall thicknesses, in particular in the curvature region in comparison with the pipe portions adjoining same, which leads to detrimental material properties for the pipe in relation to mechanical alternating stresses and material fatigue phenomena.

Preferably the support rings are connected to the flexible pipe material in force-locking and/or positively locking and/or material-bonded relationship in relation to a movement of the support rings relative to the material of the flexible pipe portions in the longitudinal direction of the pipe. By virtue of that connection of the support rings to the pipe material the support rings are stabilized in their desired position on the pipe, in particular in relation to mechanical alternating stresses on the pipe like oscillations in the longitudinal and/or transverse direction of the pipe. A positively locking connection between the support ring and the flexible pipe portion can be achieved by the material of the flexible pipe portion engaging over or also under the support ring, in respect of height, at one or preferably both sides, in relation to its two support ring end faces, wherein the flexible pipe material can bear at the end against the support ring. A material-bonded connection can be achieved by the support ring and the flexible pipe portion having a certain bonding force relative to each other, for example in the form of an adhesive or gluing force. A force-locking connection can be afforded for example by the flexible pipe material in production of the pipe experiencing a markedly greater shrinkage than the support rings, for example by virtue of cooling of the materials after production in the injection molding tool, or by the pipe produced being subjected to shrinkage by suitable post-tempering.

In accordance with a variant the flexible pipe portion is preferably of a smooth-walled configuration at the inside wall, so that the inside wall does not have any raised portions, ribs or recesses. Preferably that also applies in the region of the support rings and/or the transitional region between the flexible pipe portion and the support ring. In that way the pipe has a lower flow resistance, for example when used as an air induction pipe for a turbocharger or another item of equipment. In addition, by virtue of the smooth-walled configuration the wall thickness of the flexible pipe material, in particular in the regions between the support rings, can have particularly low tolerances, in particular when being produced using the injection molding method. The mechanical properties of the pipe and also material stressings thereof which under some circumstances can lead to material fatigue can be particularly precisely controlled in that case. That applies unlike air pipes with bellows-like portions having raised portions and recesses, in which the wall thicknesses are generally irregular, in particular when that component is produced using a blow molding method. On the pipe selected in accordance with the invention the support rings inside can terminate at least substantially flush with the inside wall of the flexible pipe portion in order to provide a pipe portion which has a smooth inside wall.

Preferably the pipe has a curvature in its longitudinal direction so that it can be used for example as an air induction manifold, in particular for turbochargers or other devices of internal combustion engines. The flexible pipe portion provided with the support rings can in that case adjoin the rings in the region of the curvature of the pipe or however directly as viewed in the pipe direction. In that way even the curved pipe portions which are subjected to particularly high levels of mechanical alternating stresses can be particularly stabilized, in particular in relation to collapse stiffness of the pipe, wherein nonetheless the wall of the flexible pipe portion can have a high level of flexibility, whereby material fatigue phenomena can also be alleviated.

If the air pipe has a curvature region with a curvature in the pipe longitudinal direction, then the support rings are preferably of such a design configuration that in the region of the inner curvature of the pipe they are of a lesser width than in the region of the outer curvature of the pipe. The support rings are therefore arranged in the curvature region of the pipe. In that respect the "width" of the support rings is to be interpreted as the extent thereof in the longitudinal direction of the pipe. The support rings can thereby be of a wedge-shaped configuration or in the shape of a segment of a circle as viewed perpendicularly to the pipe. The end faces of the support rings which are arranged perpendicularly to the longitudinal direction of the pipe can be flat. The greater extent length of the pipe at the outer curvature thereof in relation to the inner curvature can thus be at least partially compensated by a greater width of the support rings in the region of the outer curvature. The regions of the flexible pipe material, that are arranged between the support rings, can thereby at least rather be of a uniform width from the outside radius to the inside radius of the pipe curvature so that the two ends of a given flexible pipe portion which is arranged between two support rings includes a smaller angle than the two ends of a support ring arranged therebeside. The pipe curvature is therefore afforded substantially by the configuration of the support rings. It has been found that in that way, in relation to mechanical alternating stresses of the pipe, in particular in relation to oscillations transversely relative to the pipe direction or in relation to lateral forces acting on the pipe, it has a substantially longer service life. By virtue of the preferably not substantially reduced width of the flexible pipe regions in the region of the inner curvature, material stresses like stretching or compression can be distributed over a greater extent of the flexible pipe material and thus lower levels of material stressings occur, in particular in relation to small curvature radii of the pipe. The "width" of the support ring can differ at the outer curvature to the inner curvature of the pipe by the factor $\geq 3$ or $\geq 4$ or also $\geq 5$. The "width" of the flexible pipe portions can differ at the outer curvature relative to the inner curvature of the pipe by the factor $\leq 3$ or $\leq 2.5$.

If the pipe has a curvature in the longitudinal direction thereof then preferably the support rings, in the region of the outer curvature of the pipe, are of a greater angular extent in the curvature direction than the regions of the flexible pipe material, that are between the support rings, in particular in relation to the region of the outer curvature of the pipe. The pipe curvature is thus implemented therefore to a greater extent or at least substantially by the greater angular extent of the support rings.

If the pipe has a curvature in the longitudinal direction thereof then preferably the support rings in the region of the inner curvature of the pipe are of a lesser angular extent in the curvature direction than the regions of the flexible pipe material, that are between the support rings, in which case said regions of the flexible pipe material between the support rings also relate to the region of the inner curvature of the pipe.

The regions of the "inner curvature" and "outer curvature" of the pipe can respectively refer to the curvature of the pipe at the free pipe cross-section. It is generally understood that a "curvature of the pipe" refers to a state of the pipe, in which it is not exposed to external forces, in particular it is not exposed to any deformation forces.

The material thickness of the support rings perpendicularly to the pipe direction can approximately be the thickness of the flexible pipe material between the support rings, but it can also be in a factor $\geq 2$ or $\geq 3$ or $\geq 5$ of the thickness of the flexible pipe material.

The radially outward peripheral surface of the support ring can be of a smooth-walled configuration, that is to say free from projections, or in particular can also be profiled. By way of example the radial outside surface of the support rings can have grooves or ribs extending in the peripheral direction of the support ring, preferably over the full periphery in each case. In that way for example the support ring can be additionally mechanically stabilized and the strength of the connection between the support ring and the flexible pipe material can be increased, in particular in relation to forces in the pipe longitudinal direction. The profile of the flexible pipe material can be a "negative shape" of the support ring profiling, for which purpose the support ring and the flexible pipe material can be injected against each other in the injection molding method.

In accordance with an embodiment the radial insides of the support rings are of a smooth-walled configuration, that is to say are projection-free or are unprofiled, thereby giving a low flow resistance in relation to induction air or the like. Alternatively the support ring inside can also be provided with a profiling like a peripherally extending rib, for example to stabilize the support ring.

In a further preferred embodiment the flexible pipe portion has wave crests and wave troughs which are successively disposed in the pipe longitudinal direction and which can be arranged at the inside and the outside on the pipe wall. The pipe is thereby of a configuration in the manner of a bellows. The support rings in that case are preferably at least partially accommodated by the wave crests.

The pipe has a high flexibility due to the bellows-like configuration with wave crests and wave troughs, and in addition the arrangement of the support rings in the wave crests stabilizes the position thereof relative to the pipe wall, in particular in relation to displacement and/or tilting in the pipe longitudinal direction. That is advantageous in particular upon changes in position of the pipe in operation of the device like a motor vehicle, for example when the pipe is exposed to oscillations or vibration.

Preferably the support rings are laterally at least partially enclosed by the flanks of the respective pipe portion, that extend between the wave crests and the wave troughs. In that case the flanks preferably bear at the end against the support ring. Preferably the entire ends of the support ring are laterally supported by the flanks of the flexible pipe portion, that extend between the wave crest and the wave trough. The support ring therefore bears with its ends over a surface portion or over a full surface against the flanks of the flexible pipe portion, connecting the wave trough and the wave crest. Possibly the support ring can also be enclosed at its radial inside by the flexible pipe material, in which case that enclosure can be effected over the periphery of the support ring, over the entire periphery or part of the periphery, for example with a plurality of segments which are mutually spaced in the peripheral direction. In that way the position of the support ring in the pipe can be particularly stabilized, in particular even in relation to high external forces acting on the pipe.

Preferably the flank of the flexible pipe portion, that connects the wave crest and the wave trough and bears at least region-wise laterally against a support ring, has a non-rectilinear transitional region in the radial direction in which it extends. That transitional region can be provided in particular over the full periphery in relation to the pipe periphery. That non-rectilinear transitional region can be arranged in a portion of the flank of the flexible pipe material, that bears laterally against the support ring. That transitional region can be for example in the manner of a corrugation, step, bend or curvature of the flange in relation to the longitudinal section of the pipe. In that respect the longitudinal section of the pipe is a plane in which the longitudinal axis of the respective pipe portion is also disposed. That non-rectilinear transitional region provides an additional possible way of flexible movement of the pipe, for example in relation to oscillations thereof transversely relative to the longitudinal direction of the pipe as the transitional region acts in the manner of a joint connection or a hinge. On the other hand in relation to local movements of that kind of a pipe portion the non-rectilinear transitional region of the wave flank can bear against the support ring. In particular also by virtue of the substantially higher stiffness of the support ring in relation to the flexible pipe material the support ring therefore acts as a result in the manner of an abutment and can mechanically absorb forces exerted on the pipe as for example in the case of flexural or thrust stresses on the flexible pipe material. Material fatigue phenomena of the pipe material are thereby substantially alleviated.

Preferably the wave troughs of the flexible pipe portion extend towards the pipe interior beyond the support rings, and the pipe therefore has in the region of the wave troughs a smaller diameter than in the region of the support rings. In that way the support rings can be particularly fixed in position by the flanks of the flexible pipe material, that extend between the wave troughs and the wave crests. With the configuration in the form of a non-rectilinear transitional portion the bellows-like portion of the pipe can thereby also be of a high flexibility.

Preferably the ends of the support ring are shaped in the manner of a truncated cone or the ends of the support ring are arranged inclinedly in cross-section relative to the main plane of the support ring, in which case the flexible pipe material is supported or bears laterally against that region of the support ring. Alternatively, the support ring ends can be curved spherically outwardly. That configuration, upon elastic deformation of the pipe, for example in relation to flexural stresses, gives an advantageous geometry in relation to deformation of the pipe material.

Preferably the pipe is connected at its connector to a hot air component and/or a cold air component of a motor vehicle. The connector of the pipe can be formed integrally on the pipe, for example in an injection molding method. In that case the connector can be in the manner of a flange, a socket or the like. Preferably at least one of the two components of the hot air component and/or the cold air component of the motor vehicle is connected to the pipe, in particular being integrally connected thereto or shaped thereon, for example in an injection molding method. That can concern in particular the cold air component like for example a part of a filter housing. That substantially simplifies production of the pipes having regard to the adjoining assemblies and/or fitment of the pipe.

Generally, the pipe can also be releasably connected at its connector to a hot air component and/or cold air component of a motor vehicle. The hot air component can be for example a clean air inlet of a turbocharger. The cold air component can be for example a part of a filter housing which filters outside air drawn in by the turbocharger.

Preferably, the connector of the pipe is shaped at the connecting region of the hot air component and/or the cold air component in such a way that it is held in positively locking relationship in the longitudinal direction of the pipe. The connecting region of the component can thus have for example a peripherally extending web or a rib which is surrounded at both ends in relation to the longitudinal direction of the pipe by a portion of the pipe so that the pipe is fixed both in relation to tensile and also thrust forces in positively locking relationship at the connecting region. In addition, the connecting region of the adjoining component can have an abutment at which the free end of the pipe bears in end-wise relationship. The respective projection or abutment can extend around part of the periphery of the pipe, preferably a plurality of projections and/or abutments are provided which are arranged distributed around the pipe periphery. In that way thrust forces of the component connection are transmitted directly to the end of the pipe, which is particularly advantageous. In addition the free end of the pipe is mechanically protected thereby. Alternatively or in combination the connecting region of the adjoining component can include a portion like a web which is surrounded, for example by injection molding, over its full periphery by the material of the connector of the pipe. The peripheral portion or web is preferably in the form of a component part extending transversely or perpendicularly to the pipe longitudinal direction, thereby giving a particularly strong connection for the components. The material of the connector of the pipe—like generally in the context of the invention—can comprise the flexible pipe material.

According to a particularly preferred embodiment the flexible pipe material is formed from a thermoplastic vulcanisate (TPV) in the form of an elastomer. Thermoplastic vulcanisates (TPV) generally comprise a matrix phase of a thermoplastic material like a polyolefin, for example polypropylene, and a flexible cross-linked phase like in particular a rubber phase, for example based on EPDM or other preferably synthetic rubbers. The flexible cross-linked phase is finely distributed in the polymer matrix phase in the form of elastomer particles. The material of the matrix phase is generally not cross-linked. Such a material has proven to be particularly suitable for the compensation of the relative movements of the two components connected to the pipe, in particular also in relation to the mechanical and thermal stresses to which an air pipe or air induction manifold connected to a turbocharger is exposed. In particular such a material has also particularly proved its worth for enclosing a support ring comprising a comparatively dimensionally stable material. Such a thermoplastic elastomer (TPV) can also be of a bellows-like configuration, that is to say with a smooth pipe inside wall, it can well absorb mechanical alternating stresses and can well mechanically decouple from each other the hot air component and the cold air component. In addition such a material has a sufficiently high elongation at break to at least substantially withstand the negative pressure prevailing in the pipe interior. The TPV material has an adequate collapse stiffness for many situations of use so that the spaced support rings can have a sufficient lateral spacing to overall impart a high flexibility to the pipe.

In another particularly preferred variant the flexible pipe material comprises TPC, that is to say a thermoplastic copolymer. It has been found that such a material particularly well satisfies the mechanical and thermal requirements, in particular it has particularly good negative/positive pressure stability (collapse stability) and sufficient softness as well as elongation at break to provide for movement compensation in relation to oscillations and the like. That applies in particular when used in relation to a pipe like an air pipe for connection to a turbocharger or another hot component.

Such a material is particularly preferred if the pipe is of a bellows-like configuration with wave crests and wave troughs. The pipe according to the invention has also particularly proven its worth in uses involving a high negative or positive pressure in the pipe like a clean air pipe or a charge air pipe of a turbocharger, in particular in connection with components which at least substantially (for example at more than 50% by weight) or completely comprise polyalkylene terephthalate (PAT) or further preferably polybutylene terephthalate (PBT).

Particularly preferably the pipe at least partially or completely comprises a thermoplastic copolymer (TPC), particularly preferably in a proportion of ≥50% by weight, ≥75% by weight, ≥85% by weight or at least practically completely. That refers to the content of organic plastics of the pipe, therefore irrespective of fillers, fiber reinforcements like glass fibers or the like. It has been found that an air pipe comprising a TPC polymer excellently well fulfils the mechanical and thermal requirements, in particular even when the pipe is used for connection to a hot component like a turbocharger. The TPC polymer can be in particular a thermoplastic polyester elastomer which for the situation of use combines very good mechanical and thermal properties. In that case the polyester preferably forms the hard phase. For individual situations of use but generally less preferably the elastomer can for example also be a styrene block copolymer (TPS), a thermoplastic polyurethane or a thermoplastic polyether polyamide. A TPC material can therefore also be particularly preferably used as in comparison with a vulcanized thermoplastic material, it has higher strength and thus higher strength in relation to positive pressure and/or negative pressure.

In the case of a thermoplastic elastomer there is generally a multi-phase plastic with rubber-elastically deformable molecule regions in which regions of meltable, in particular amorphous thermoplastics are incorporated. In that respect the term copolymer is generally used to mean two- or more-phase plastics or possibly also polymer blends. The thermoplastic elastomer therefore generally comprises an elastic soft phase and a thermoplastic kind of hard phase. In that respect the hard phase generally represents a matrix so that the polymer material can thus be at least partially or completely melted and can be processed in the injection molding method. The hard segments in that respect can be amorphous or partially crystalline, for example they can also have macromolecules reversibly cross-linked thermally by ion clusters, with a low cross-linking density. Optionally it is also possible to use blends of thermoplastics with certain or high proportions of cross-linked or non-cross-linked elastomer phase. The elastomer phase can be cross-linked with the formation of a vulcanized thermoplastic, particularly preferably by virtue of the increased strength and/or flexural stiffness of the material non-vulcanized thermoplastic elastomers are used so that the pipe can carry an increased negative or positive pressure without deformation or collapse.

The Shore hardness of the elastomer pipe material is preferably in the range of 30 Shore A through 80 Shore A, possibly even higher, particularly preferably in the range of 35 through 50 Shore A. For certain situations of use as in clean air pipes a hardness of 30-50 Shore A is particularly preferred, for other situations of use, in particular involving a higher internal pressure as in the case of charge air pipes, a hardness of 40-80 Shore A. The tensile modulus of elasticity of the elastomer pipe material is preferably in the region of 20 through 100 MPa. The specifications respectively relate to the relevant DIN standards with applicability of Jan. 1 2018.

The flexible pipe material preferably has a continuous temperature resistance of greater than or equal to 100° C., preferably ≥120° C., preferably ≥130° C.

It has proven to be particularly preferable if the support rings comprise a plastic material, in particular hard plastic. In relation to the material stresses polyamide has proven to be particularly advantageous. That applies in particular also in relation to the adhesion or material-bonded connection of the support ring material to the flexible pipe material which in particular can be TPV or TPC.

Particularly preferably the connecting region of one of the components, that is integrally connected to a pipe end, comprises a polyalkylene terephthalate (PAT) material or further preferably a polybutylene terephthalate (PBT) material. The connecting portion in that case can comprise ≥50% by weight or ≥75% by weight, particularly preferably ≥85% by weight or at least practically completely PAT or PBT. That applies in particular if the material of the flexible pipe portion is TPV or in particular TPC. The PAT or PBT material can be reinforced by fillers and particular fibers like glass and/or plastic fibers, or can also be used without reinforcement. In the production of the pipe with the connecting portion of the component to be connected, for example a flange of a filter housing, the pipe and the connecting region of the adjacent component can be produced together using the injection molding method, for example the two- or multi-component injection molding method. It has been found that, when using the connecting portion of PAT, in particular PBT, and the pipe of TPC, there is a particularly intimate joining connection between the two materials, which involves the character of a chemical join. The adhesion of the two specified components of PAT or PBT and TPC respectively is thus substantially higher than in the case of a purely surface or cohesive bonding of the two components to each other. It has been found that such a connection has proven to be particularly good when connecting an air pipe to the adjoining component, in consideration of the high thermal and mechanical loadings of the connecting region, in particular having regard to severe vibration or oscillations of the air pipe in operation of a motor vehicle. Particularly in relation to high negative or positive pressures in the pipe like for example also in the form of a clean air pipe or an induction pipe or a charge air pipe of a turbocharger, that design configuration has proven particularly worthwhile. Possibly however the connecting portion can also comprise polycarbonate or polycarbonate/ABS or can contain those components in a certain proportion, for example ≥5% by weight or ≥10% by weight, possibly also ≥25% by weight, preferably not ≥25% by weight or not ≥10% by weight.

Particularly preferably the pipe comprises TPC, possibly also TPV, in which case the pipe is welded to a connecting portion of a motor vehicle device which at least partially or completely comprises PAT or in particular PBT. The device can be in particular a motor vehicle device disclosed in the context of the invention. The welding operation is particularly preferably carried out as a hot gas welding process. Such a connection between pipe and connecting portion is particularly good, in particular in relation to high mechanical and thermal stresses on the pipe, including alternating stresses, to which the connecting region of the pipe and the connecting portion is also exposed. The use of the hot gas welding process is particularly preferred as here it is possible to achieve a connection affording a high loading strength and of high dimensional accuracy, in particular in relation to the area of use of the present invention, in which respect the influx of heat to the connecting region can be exactly limited. The welding procedure can be carried out directly in the injection molding tool whereby the pipe connection can be carried out in terms of method procedure easily but at the same time with a high accuracy and the connecting region has a long service life.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
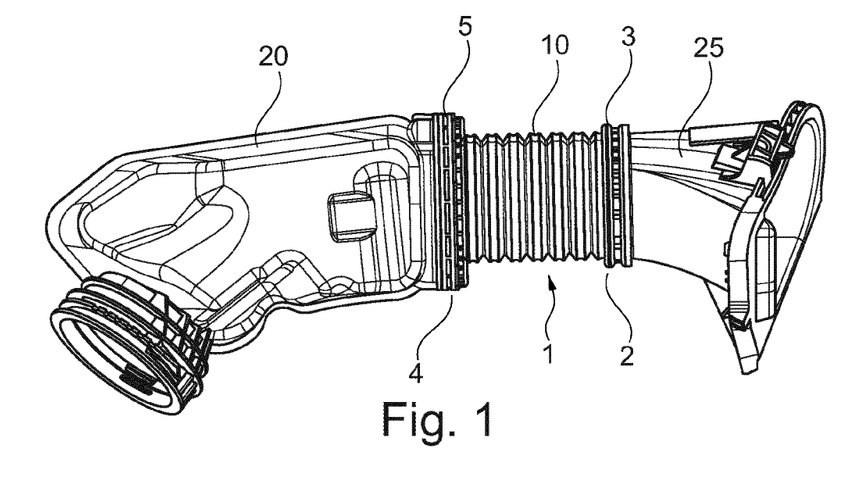
FIG. 1 shows a plan view of a component arrangement of an air pipe according to the invention with connecting portions of a hot air component and a cold air component.

FIG. 1 shows an air pipe 1 according to the invention for motor vehicles, in particular for connecting a hot component 20 to a cold component 25, wherein provided at a first end 2 of the pipe is a first connector 3 for air-tightly fixing the air pipe 1 to the hot component 20 while provided at the second end 4 of the pipe is a second connector 5 for air-tightly fixing the pipe to the cold component 25. At least one flexible pipe portion 10 is provided between the first and the second connectors 3, 5. The pipe has a free pipe cross-section. The hot component 20 can be welded to the connector 3 of the pipe. The cold component 25 can be connected integrally to the second connector 5 of the pipe 1, for example being injection molded thereto. The first and the second connector 3, 5 of the pipe can be in the form of a rigid component like for example a socket or connecting piece. A corresponding configuration can apply for the connecting portions of the components connected with the pipe like the hot and/or cold component, without being restricted thereto. The connector 3 or 5 of the pipe and/or the connecting portion of the other preferably rigid component here comprise PBT (polybutylene terephthalate). The hot component 20 here is the connecting portion of a turbocharger while the cold component 25 is a filter housing for filtering induction air of the turbocharger, wherein the pipe however is not limited to that area of use and for example can be used as a charge air pipe or an unfiltered air pipe, in particular in each case for supplying a turbocharger.

The connection of the pipe to the connecting portion of the turbocharger or another motor vehicle device is effected in particular by welding, more especially by hot gas welding. That applies in particular if the pipe comprises a TPC material and the connecting portion at least partially or completely comprises PBT (polybutylene terephthalate).

Figure 2:
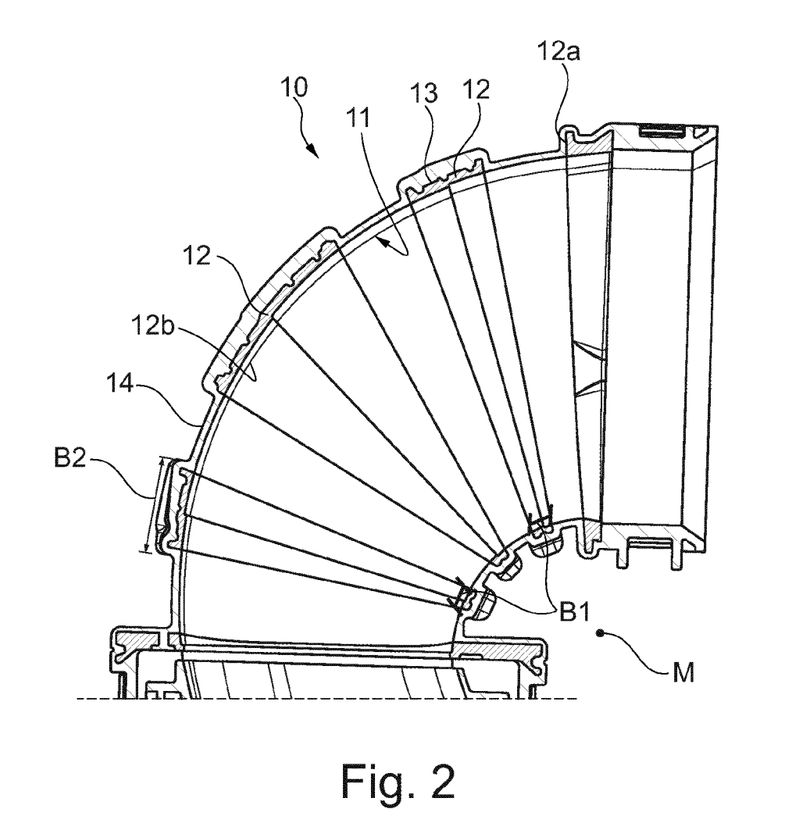
FIG. 2 shows a longitudinal section of a pipe according to the invention of a first embodiment.
Figure 3:
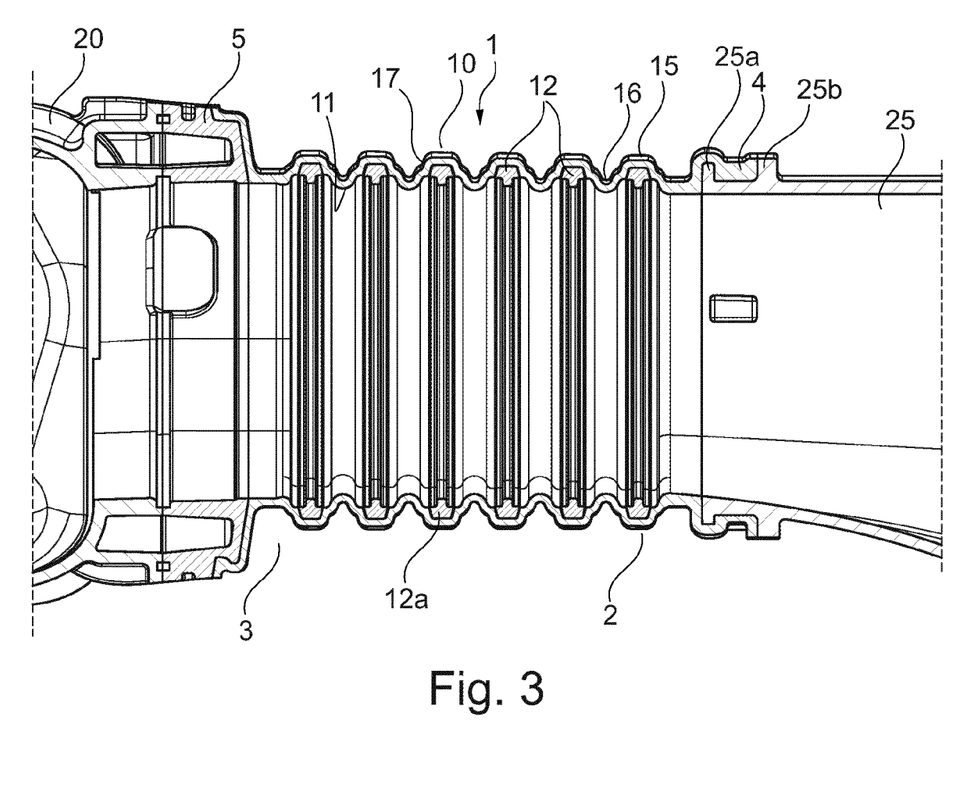
FIG. 3 shows a longitudinal section of a pipe according to the invention of a further embodiment.

In the embodiments in FIGS. 2 and 3 the flexible pipe portion 10 has a wall 11 comprising a flexible pipe material. The wall is of an air-tight configuration in the manner of a hose. The wall 11 extends continuously over the length and the periphery of the pipe portion. According to the invention there are support rings 12 comprising a material which is dimensionally stable in relation to the flexible pipe material, which support rings surround the free pipe cross-section and stabilize the flexible pipe portion in its cross-sectional shape. The support rings 12 are spaced from each other in the pipe longitudinal direction, portions 13 of the flexible pipe material extending between the support rings 12.

Unless otherwise indicated from the context the passages of description respectively apply to all embodiments.

The flexible pipe portion, that is to say the wall 11 together with the support rings 12, is produced in a two-component injection molding method. The wall 11 and the support rings 12 are adhesively joined together by the injection molding procedure and the material selection.

The support rings 12 are connected to the flexible pipe material in force-locking and/or positively locking and/or material-bonded relationship in relation to a movement of the rings relative to the material of the flexible pipe portion in the longitudinal direction of the pipe. That is effected on the one hand by the above-mentioned adhesive forces. On the other hand at their ends 12a the support rings are enclosed by the flexible pipe material, with same bearing snugly against each other. The pipe material therefore extends, bearing against the support rings, at least over a part of the thickness of same. In that case the support rings 12 are arranged in grooves (FIG. 2) or in wave crests (FIG. 3) of the flexible pipe material. The support rings 12 are arranged radially inwardly at the wall 11 of the flexible pipe portion.

According to the embodiment of FIG. 2 the flexible pipe portion has a smooth inside wall, being therefore free from projections or recesses or other profilings. That relates both to the insides 12b of the support ring and also the lengthwise portions 14 of flexible pipe material between the support rings. On the outside the support rings 12 have rib-shaped profilings 13 which cooperate in congruent relationship with negatively shaped profilings of the flexible pipe material, which can be effected by injection molding of pipe material and support ring material to each other. The mechanical connection of the pipe material and the support rings, in particular in relation to forces in the longitudinal direction of the pipe, is thereby substantially improved.

As shown in FIG. 2 the support rings 12 are arranged in the region of a curvature of the pipe and in the longitudinal direction of the pipe in the region of the inner curvature of the pipe they are of a smaller width B1 than the width B2 in the region of the outer curvature of the pipe. In the region of the outer curvature of the pipe the support rings 12 have a greater angular extent in the curvature direction than the regions 14 of the flexible pipe material, that are between the support rings 12. In the region of the inner curvature of the pipe the support rings 12 have a smaller angular extent in the curvature direction than the regions 14 of the flexible pipe material, that are between the support rings. The angular extent refers in each case to the curvature center point M of the pipe, which defines the curvature radius.

As shown in FIGS. 2 and 3 the support rings 12 are at least partially or completely enclosed by the material of the flexible pipe portion. For that purpose the support rings 12 are arranged in grooves in the flexible pipe material (FIG. 2) or in wave crests (FIG. 3), wherein the flexible pipe material bears at the respective ends against the support rings 12, preferably being adhesively joined thereto.

In the embodiment in FIG. 3 the flexible pipe portion 10 is of a bellows-like configuration with wave crests 16 and wave troughs 17 and the support rings 12 are disposed in the region of the wave crests 16. The flexible pipe material also encloses the ends 12a of the support rings over at least a part of the material thickness thereof. The support ring ends 12a are set inclinedly in the radial direction or are of a frusto-conical configuration. Between a wave crest 15 and a wave trough 16 the flexible pipe portion has a respective non-rectilinear transitional region 17 which directly adjoins the support ring end face 12a, which has been found to be particularly advantageous in relation to mechanical alternating stresses as in the case of oscillations. For stiffening the support ring a peripherally extending rib 18 is provided at the inside 12c thereof.

As shown in FIG. 3 the connecting region of the component 25 that is connected to the pipe has the first connector 3 of the pipe injection molded therearound. In this case the component 25 has at least one radial projection 25a which, viewed in the longitudinal direction of the pipe, has the flexible pipe material injection molded therebehind. The projection 25a can extend peripherally or can be in the form of a plurality of projections arranged distributed in the peripheral direction. In addition provided on the component 25 is an abutment 25b, here in the form of a peripherally extending flange, against which the end face of the pipe end bears and is thus protected.

The material of the flexible pipe portion 10 in accordance with the embodiment of FIG. 2 but also that of FIG. 3 is here a TPV elastomer. The material of the flexible pipe portion 10 of the embodiment of FIG. 3 but possibly also FIG. 2 is here a TPC elastomer. The material of the support ring 12 can respectively be a plastic material, in particular a hard plastic, more especially preferably polyamide.

The flexible pipe material can be of a hardness of about 40 Shore A and a tensile modulus of elasticity of 50 MPa.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

LIST OF REFERENCES 1 pipe
2 first end
3 connector
4 second end
5 connector
10 flexible pipe portion
11 wall
12 support ring
12a support ring end
12b support ring inside
13 profiling
14 region of the flexible pipe portion
15 wave crest
16 wave trough
17 transitional region
18 support ring rib
20 hot component
25 cold component
25a projection
25b abutment
B1 first width
B2 second width

The invention claimed is:

1. An air pipe for motor vehicles comprising:
a first connector at a first end of the pipe for air-tightly fixing the air pipe to a hot component;
a second connector at a second end of the pipe for air-tightly fixing the pipe to a cold component;
at least one flexible pipe portion between the first and the second connectors;
a free pipe cross-section; and
support rings constructed of a material which is dimensionally stable in relation to a material of the flexible pipe portion, the support rings surrounding free pipe cross-section and stabilizing the flexible pipe portion in its cross-sectional shape, wherein the pipe has an inner curvature and an outer curvature, and each of the support rings defines a respective first width, in a longitudinal direction of the pipe, proximate the inner curvature and defines a respective second width, in the longitudinal direction of the pipe, proximate the outer curvature, the first width being smaller than the second width.

2. The pipe as set forth in claim 1, wherein the support rings and the flexible pipe material are produced in a two or multi-component injection molding method.

3. The pipe as set forth in claim 1, wherein the support rings are connected to the flexible pipe material in force-locking and/or positively locking and/or material-bonded relationship in relation to a movement of the support rings relative to the material of the flexible pipe portions in the longitudinal direction of the pipe.

4. The pipe as set forth in claim 1, wherein the support rings are arranged radially at the inside at the wall of the flexible pipe portion.

5. The pipe as set forth in claim 1, wherein the flexible pipe portion is of a smooth-walled configuration at the inside wall.

6. The pipe as set forth in claim 1, wherein the pipe has a curvature in the pipe longitudinal direction and the support rings in the region of the outer curvature of the pipe have a greater angular extent in the curvature direction than the regions of the flexible pipe material, that are between the support rings.

7. The pipe as set forth in claim 1, the pipe has a curvature in the pipe longitudinal direction and the support rings in the region of the inner curvature of the pipe have a smaller angular extent in the curvature direction than the regions of the flexible pipe material, that are between the support rings.

8. The pipe as set forth in claim 1, wherein the support rings are at least partially or completely surrounded by the material of the flexible pipe portion.

9. The pipe as set forth in claim 1, wherein the flexible pipe portion has wave crests and wave troughs and the support rings are arranged in the region of the wave crests.

10. The pipe as set forth in claim 9, wherein the support rings are laterally at least partially enclosed by the portions of the wave crests, that extend in a direction towards the wave troughs.

11. The pipe as set forth in claim 9, wherein between a wave crest and a wave trough the flexible pipe portion has a non-rectilinear transition.

12. The pipe as set forth in claim 1, wherein the material of the flexible pipe portion is a TPV elastomer.

13. The pipe as set forth in claim 1, wherein the flexible pipe material at least partially or completely comprises an TPC elastomer.

14. The pipe as set forth in claim 1, wherein the material of the support ring is a polyamide.

15. The pipe as set forth in claim 1, wherein the first and/or the second connectors of the pipe are formed on a rigid component.

16. The pipe as set forth in claim 1, wherein the first and second connectors of the pipe and/or the rigid component comprise polyalkylene terephthalate (PAT) or PBT (polybutylene terephthalate).

17. The pipe as set forth in claim 1, wherein, at the first and second connectors, the pipe is connected to a hot air component and/or a cold air component of a motor vehicle.

18. A turbocharger having an air pipe as set forth in claim 1, wherein the first connector of the pipe can be or is connected to a clean air intake of the turbocharger.

19. A filter housing having an air pipe as set forth claim 1, wherein the second connector is or can be connected to an air outlet of the filter housing.

20. A connecting portion of a motor vehicle device having a pipe as set forth in claim 1, wherein the connecting portion at least partially or completely comprises polyalkylene terephthalate (PAT) or PBT (polybutylene terephthalate), the pipe comprises TPC and the pipe is welded to the connecting portion.

* * * * *